United States Patent
Naber (10) Patent No.: US 10,183,774 B2
(45) Date of Patent: Jan. 22, 2019

(54) PACKAGE, METHOD FOR MANUFACTURING A PACKAGE, AND MOLD FOR APPLICATION FOR THE PURPOSE OF SUCH METHOD

(71) Applicant: Naber Beheer B.V., Waalwijk (NL)

(72) Inventor: Wilhelmus Cornelis Maria Naber, Waalwijk (NL)

(73) Assignee: Naber Beheer B.V., Waalwijk (NL)

( * ) Notice: Subject to any disclaimer, the term of this patent is extended or adjusted under 35 U.S.C. 154(b) by 487 days.

(21) Appl. No.: 14/759,173

(22) PCT Filed: Jan. 20, 2014

(86) PCT No.: PCT/NL2014/050022
§ 371 (c)(1),
(2) Date: Jul. 2, 2015

(87) PCT Pub. No.: WO2014/112876
PCT Pub. Date: Jul. 24, 2014

(65) Prior Publication Data
US 2015/0353224 A1 Dec. 10, 2015

(30) Foreign Application Priority Data

Jan. 18, 2013 (NL) .................................... 2010144
Sep. 12, 2013 (NL) .................................... 2011432

(51) Int. Cl.
*B29C 55/10* (2006.01)
*B65D 1/34* (2006.01)
(Continued)

(52) U.S. Cl.
CPC .............. *B65D 1/34* (2013.01); *B29C 51/325* (2013.01); *B29C 55/10* (2013.01); *B29D 22/003* (2013.01);
(Continued)

(58) Field of Classification Search
CPC ......... B29C 51/10; B29C 51/325; B29C 5/10; B29C 65/02
(Continued)

(56) References Cited

U.S. PATENT DOCUMENTS 3,011,212 A   12/1961 Marshall et al.
3,470,281 A * 9/1969 Knowles ................. B29C 51/04
                                                         264/294
(Continued)

FOREIGN PATENT DOCUMENTS

DE   9311330 U1   10/1993
DE   20009821 U1  10/2001
(Continued)

OTHER PUBLICATIONS

International Search Report in related PCT Application No. PCT/NL2014/050022, dated Aug. 19, 2014.
(Continued)

*Primary Examiner* — King M Chu
(74) *Attorney, Agent, or Firm* — Troutman Sanders LLP; Ryan A. Schneider (57) ABSTRACT

A package comprises an entirety of a tray (10) having an open side and a ring-shaped cover rim (20) which is located at the open side of the tray (10), at an outer circumferential rim (16) of the tray (10), and which is connected to the tray (10) through a relatively weak breaking portion (30). For the purpose of manufacturing the package, a mold (41) is provided. Also, a sheet (40) is provided and placed in the mold (41), wherein a movement of the sheet (40) is forced in two different directions. The cover rim (20) is formed with an inner ring (21) in which an inward bulge (28) is realized, along at least a portion of the circumference thereof, as an aids in establishing a clamping connection between the
(Continued)

cover rim (20) and the tray (10) once the cover rim (20) has been broken away from the tray (10).

18 Claims, 5 Drawing Sheets

(51) Int. Cl.
  *B29D 22/00*     (2006.01)
  *B65D 77/20*     (2006.01)
  *B29C 51/32*     (2006.01)
  *B29L 31/00*     (2006.01)
  *B29L 31/56*     (2006.01)
  *B29C 51/10*     (2006.01)
  *B29C 65/00*     (2006.01)
  *B29C 65/02*     (2006.01)

(52) U.S. Cl.
  CPC ..... *B65D 77/2052* (2013.01); *B65D 77/2092* (2013.01); *B29C 51/10* (2013.01); *B29C 65/02* (2013.01); *B29C 66/112* (2013.01); *B29C 66/131* (2013.01); *B29C 66/53461* (2013.01); *B29C 2791/001* (2013.01); *B29C 2791/006* (2013.01); *B29C 2793/009* (2013.01); *B29C 2793/0045* (2013.01); *B29C 2793/0054* (2013.01); *B29C 2793/0072* (2013.01); *B29L 2031/565* (2013.01); *B29L 2031/712* (2013.01); *B29L 2031/7132* (2013.01); *B29L 2031/7162* (2013.01); *B29L 2031/7282* (2013.01); *B65D 2577/2083* (2013.01)

(58) Field of Classification Search
  USPC .................................. 206/557; 264/551, 153
  See application file for complete search history.

(56) References Cited

U.S. PATENT DOCUMENTS

| | | | |
|---|---|---|---|
| 3,515,334 A | 6/1970 | Jacobson | |
| 6,382,949 B1 * | 5/2002 | Matsumoto | B29C 43/36 |
| | | | 264/255 |
| 2007/0194495 A1 | 8/2007 | Henderson et al. | |
| 2008/0302798 A1 | 12/2008 | Foldesi et al. | |

FOREIGN PATENT DOCUMENTS

| | | |
|---|---|---|
| DE | 202009009762 U1 | 10/2009 |
| EP | 0376413 A1 | 7/1990 |
| EP | 0513888 A1 | 11/1992 |
| EP | 1930253 A1 | 6/2008 |
| FR | 2618411 A1 | 1/1989 |
| JP | H01124570 A | 5/1989 |
| JP | H02219771 A | 9/1990 |
| JP | 2002539042 A | 9/2000 |
| JP | 2006-88669 A | 4/2006 |
| JP | 2011219128 A | 11/2011 |
| JP | 2012505797 A | 3/2012 |
| SE | 7317362 L | 6/1975 |
| WO | 0053510 A1 | 9/2000 |
| WO | 2000053510 A1 | 9/2000 |
| WO | 2005039997 A1 | 5/2005 |
| WO | 2010018304 A1 | 2/2010 |
| WO | 2011126046 A1 | 10/2011 |
| WO | 2012087114 A1 | 6/2012 |

OTHER PUBLICATIONS

Search Report and Written Opinion in related NL Application 2010144 dated Oct. 30, 2013.
Search Report and Written Opinion in related NL Application 2010132 dated May 13, 2014.
Japanese Office Action issued in related Japanese Application No. 2015-553672 dated Jan. 30, 2018, 9 pages.

* cited by examiner

PACKAGE, METHOD FOR MANUFACTURING A PACKAGE, AND MOLD FOR APPLICATION FOR THE PURPOSE OF SUCH METHOD

CROSS-REFERENCE TO RELATED APPLICATIONS

This application is a US National Stage of International Application No. PCT/NL2014/050022, filed 20 Jan. 2014, which claims the benefit of NL 2010144, filed 18 Jan. 2013 and NL 2011432, filed 12 Sep. 2013, both herein fully incorporated by reference.

The invention relates to a package, comprising an entirety of a tray having an open side and a ring-shaped cover rim which is located at the open side of the tray, at an outer circumferential rim of the tray, and which is connected to the tray through a relatively weak breaking portion. The invention also relates to a method for manufacturing such package, as well as to a mold for application for the purpose of such method.

The package as described in the foregoing is usually manufactured from plastic, and can be applied for the purpose of packing food products, for example.

An example of the method for manufacturing a package having an entirety of tray, breaking portion and cover rim is shown in FR 2 618 411. According to the known method, in order to seal the tray of the package, a piece of cover foil is provided, which is connected to at least the cover rim of the package, and possibly also to the tray. At first use of the package, a user breaks the breaking portion between the cover rim and the tray, and subsequently pulls the entirety of cover rim and cover foil away from the tray, wherein a possible connection between the cover foil and the tray is broken. From that first use on, the entirety of cover rim and cover foil, which will hereinafter be referred to as cover, can be placed back on the tray or removed from the tray again, according to liking. Near the open side, the tray has a recess into which a portion of the cover rim can snap, so that on the basis thereof it is possible to repeatedly establish a temporary connection between the cover and the tray. The tray and the cover rim are manufactured as an entirety by means of injection molding, wherein the breaking portion is thick enough for having a flow of plastic during the injection molding process through this portion on the one hand, and thin enough for enabling a user of the package to break the cover rim away from the tray at first use on the other hand.

An important advantage of the known method is that until first use, the internal space of the tray can remain fully sealed from the outside world. The connection between the cover foil and at least the cover rim can be realized along the entire circumference of the cover rim, so that there is not any interruption of the connection which might be a leak between the internal space of the tray and the outside world. Another important advantage is that material is saved by letting the cover foil which is used in a first instance for completely sealing the internal space of the tray be an integral part of the cover. This is different than many conventional situations in which a piece of cover foil is connected to a tray first, after which a complete cover is placed on the sealed tray, covering the cover foil, usually by means of a snap connection. In such situations, at first use, a user removes the cover from the tray, subsequently pulls the cover foil away from the tray, and throws it away, or possibly leaves it at the tray, in a state of being only partially detached. In any case, the cover foil does no longer have a sealing function then. After first use, it is only the cover by means of which this function is actually taken care of.

Especially in packing food products, it is important that a tray is sealed in a reliable manner before first use. In that case, there is practically no risk that the tray can open unintendedly, and that the content of the tray can go to waste. For certain types of food products, it can be important to have an air-tight seal, because in that case it is possible to guarantee a certain shelf life of the packed food products.

WO 2005/039997 relates to a method for manufacturing a package having a tray and a cover comprising a cover rim and a piece of cover foil, wherein the tray and the cover rim are formed separately from each other and then put together, or wherein the tray and the cover rim are connected to each other through one or more small pieces of material, which serve as hinges in that case. In both cases, the cover rim needs to be placed on the tray first, in a correct manner, prior to applying the cover foil.

DE 93 11 330 shows a package having an entirety of tray, breaking portion and cover rim, wherein the open side of the tray is sealed by means of a piece of cover foil which is connected to the cover rim, and wherein the breaking portion and the cover rim surround the outer circumferential rim of the tray. Prior to the first use, a surface of the cover rim to which the cover foil is connected is located at a higher level than the outer circumferential rim of the tray. Once the breaking portion has been broken, the entirety of cover rim and cover foil can be put back on the tray as cover, wherein an inwardly projecting portion of the cover rim engages underneath the outer circumferential rim of the tray.

A disadvantage of the method known from FR 2 618 411 is that the design of the package has as a consequence that it is practically only possible to manufacture the entirety of tray, breaking portion and cover rim by means of injection molding. The same is true in respect of the manufacturability of the package which is known from DE 93 11 330. A disadvantage of the method known from WO 2005/039997 is that an additional step of placing the cover rim on the tray needs to be carried out before the cover foil can be applied to the assembly of tray and cover rims.

It is an object of the invention to provide a method for manufacturing a package having a tray, a breaking portion and a cover rim, wherein the manufacturing process can be efficient and relatively cheap, which is desirable as the package is typically a product which is suitable for manufacturing in mass production, and wherein it is also possible to provide for a reliable seal of the tray before a first use, particularly a seal by means of a piece of cover foil for realizing the advantages of saving of material and avoiding the application of cover foil which no longer has a function after the first use, as mentioned earlier.

The object as set is achieved by a method for manufacturing a package comprising an entirety of a tray having an open side and a ring-shaped cover rim which is located at the open side of the tray, at an outer circumferential rim of the tray, and which is connected to the tray through a relatively weak breaking portion, wherein a mold is provided, wherein a sheet is provided and is placed in the mold, and wherein a movement of the sheet is forced in two different directions in order to form the sheet as the package having the tray and the cover rim.

According to the invention, the entirety of tray, breaking portion and cover rim is manufactured on the basis of a sheet which is put to the desired shape in a mold, wherein a movement of the sheet is forced in two different directions. In a practical way of realizing the invention, the sheet is planar in a first instance. In that case, the sheet is subjected to forces in the mold in order to put it to the desired shape as defined in the mold. For example, this can be done by applying techniques which are known as vacuum forming or thermo forming. In general, with this techniques known per se, material is heated first and then plastically deformed. The techniques are particularly suitable for making formed products in mass production on the basis of planar sheets, which are also denoted as foils or plates, for example.

Vacuum forming or thermo forming is a relatively cheap manufacturing method, assuming that the method is applied for the purpose of mass production. Furthermore, vacuum forming or thermo forming offers the possibility of applying various types of plastic, including PVC (polyvinylchloride), PET (polyethylene terephthalate) and APET (amorphous polyethylene terephthalate), or a multilayer foil having a suitable composition such as PP EHOV PP (polypropylene ethylene vinyl alcohol polypropylene). Especially a multilayer foil is very much suitable to be applied for packing food products, in view of the fact that it has good barrier properties, i.e. it is well capable of preventing exchange of gas between a sealed interior of a package and an environment of the package. As a result, it is capable of preventing that oxygen from the air gets inside a package all too soon, which is beneficial to the shelf life of food products being packed in a protective atmosphere.

In vacuum forming or thermo forming, it is common use to subject a sheet to forces in only one direction. Contrariwise, the invention provides for a forced movement of the sheet in two different directions. Preferably, an area of the sheet which is destined to constitute the breaking portion constitutes a separation between the two differently directed forming actions, so that the sheet is fixed at the position of that portion and can be weakened in a manner as desired by applying a suitable tool. In a practical sense, the said portion of the sheet can be a ring-shaped portion, which is clamped for the purpose of the forming process, wherein a portion of the sheet inward of the ring-shaped portion and a portion of the sheet outward of the ring-shaped portion are moved in the two different directions.

Preferably, the sheet is forced to perform the movements in the two different directions simultaneously. As a consequence, the forming process can take place in a period which is as short as possible. In any case, on the basis of the invention, it is possible to have a certain extent of freedom in designing the tray and the cover rim which is higher than when the tray and the cover rim would be formed on the basis of a sheet which is forced in a single direction. Moreover, there is more freedom to design the mold without invoking difficulties in respect of releasing the entirety of tray, breaking portion and cover rim from the mold.

EP 1 930 253 discloses a package having an entirety of tray, breaking portion and cover rim, wherein the open side of the tray is sealed by means of a piece of cover foil which is connected to the cover rim, and wherein the breaking portion and the cover rim surround the outer circumferential rim of the tray. In a first instance, an entirety of tray and cover rim is manufactured by means of vacuum forming or thermo forming, after which the breaking portion is realized by applying perforations between the tray and the cover rim. Different from what is the case with the invention, there is no sheet of which different portions are moved in different direction in forming the entirety of tray and cover rim. Hence, the design of the package is suitable to be realized on the basis of vacuum forming or thermo forming in a conventional sense, wherein a single direction for forcing the sheet is applied.

Once the breaking portion of the package known from EP 1 930 253 has been broken, the entirety of cover rim and cover foil can be placed back on the tray as cover and be connected to the tray. To this end, the cover rim is provided with a number of projections, and the tray is provided with a number of notches in the Outer circumferential rim. By positioning the cover rim with respect to the tray in such a way that the projections of the cover rim are aligned with the notches in the outer circumferential rim of the tray, and subsequently rotating the cover rim with respect to the tray along an angle of about 45°, a user of the package can establish a detachable connection as desired between the entirety of cover rim and cover foil on the one hand and the tray on the other hand. This requires an accurate action from the user, which is undesirable in the context of a simple article of everyday use such as the package. In the framework of the invention, a design of the package is possible in which the cover rim has an inner ring in which an inward bulge is present, along at least a portion of the circumference thereof. The bulge has a function in establishing a clamping connection between the cover rim and the tray, in which a correct, centered position of the cover rim with respect to the tray is realized. When the cover rim is pressed on the tray, the inner ring of the cover rim and the tray at the position of the outer circumferential rim are pressed inwardly in a resilient fashion until the bulge has reached a position beyond the circumferential rim of the tray. At that moment, the inner ring of the cover rim and the tray at the position of the outer circumferential rim can move outwardly again, in a resilient fashion, wherein a clamping connection between the cover rim and the tray is obtained. Different from what is the case in the art, a user of the package according to the invention does not need to make an effort to position projections in notches for the purpose of fixing the cover rim on the tray. Instead, the bulge as described is provided as an aids, wherein the cover rim can be placed on the tray in any rotated position, and wherein no more than a downwardly directed linear movement of the cover rim with respect to the tray is sufficient for establishing a connection between the cover rim and the tray.

It is practical when the mold comprises a number of separate elements, including a first forming element having a forming surface which is shaped according to an under surface of the tray, and a second forming element having a forming surface which is shaped according to an upper surface of the cover rim. In that case, the sheet is placed in the mold with the first forming element at one side of the sheet and the second forming element at the other side of the sheet, wherein the sheet is clamped between portions of the first forming element and the second forming element facing each other. Furthermore, the first forming element is surrounded by a movably arranged tubular punching knife. According to the invention, a movement of the sheet is forced in two opposite directions with respect to the portions of the first forming element and the second forming element facing each other, between which the sheet is clamped, in order to put a first portion of the sheet to a condition in which it contacts the forming surface of the first forming element and thereby constitutes the tray, and to put a second portion of the sheet to a condition in which it contacts the forming surface of the second forming element and thereby constitutes the cover rim. The punching knife is moved in the direction of the sheet and partially pressed in the sheet in order to realize the breaking portion between the tray and the cover rim.

Areas of the breaking portion which are weaker and less weak as desired can be realized by applying a serrated punching knife. As a consequence, a single, relatively simple movement of the punching knife is possible. For example, it is possible to realize openings between the tray and the cover rim at defined places by applying the punching knife. In that case, the breaking portion is perforated, as a result of which it is even possible to break the breaking portion by hand.

In the framework of the invention, it is possible to carry out the movement of the punching knife in the sheet simultaneously with detaching the package from surrounding material of the sheet. In that case, the package is finished in one single punching movement after the forming process, as it were. It is advantageous when making the package takes as less as possible time. Simultaneously carrying out the said actions can contribute to that. That does not alter the fact that in the framework of the invention, it is also possible to carry out these actions in a successive manner.

In a practical application of the method according to the invention, the sheet is heated prior to forming the sheet. In general, it can be assumed that the material of the sheet can easier be deformed in heated condition than in unheated condition. In any case, this is the case with many common types of plastic.

The forming movements of the sheet in the mold as desired can be realized by applying pressure differences over the sheet. For example, underpressures can be created in areas of the sheet which need to be moved in the direction of a surface of the mold, and/or overpressures at another side of those areas of the sheet, wherein compressed air can be used in that case. For the sake of completeness, it is noted that in that case, it is advantageous when the sheet is fixed in a clamping gastight fashion during manufacture of the package, so that leakage of compressed air between the areas where forming the sheet in different directions takes place practically does not occur.

The package which is obtained by applying the method according to the invention can be provided with a piece of cover foil in a simple manner, for sealing the package. In that case, such piece of cover foil is connected to at least the cover rim. This can be done in a situation in which the cover rim and the tray are connected to each other through the breaking portion, but it is also possible to do so after the breaking portion has been broken first. In that case, the cover rim and the tray are detached from each other by forcing a limited mutual movement of the cover rim and the tray, wherein the breaking portion is broken. In that case, this can be done mechanically, while in the first case, breaking the breaking portion will usually be carried out manually by a user of the package. In respect of the first case, it is furthermore noted that a package can be obtained in which, prior to the first use, the cover foil is located at a higher level with respect to a bottom of the tray than when the breaking portion has been broken. In particular, this is possible when at least a portion of the cover rim projects upwardly with respect to the tray, from the breaking portion when that portion has not yet been broken, in a normal orientation of the package in which the open side of the tray is situated at an upper side, and in which the bottom of the tray is situated at an under side. As soon as the breaking portion has been broken, the entirety of cover rim and piece of cover foil, which constitutes a cover for the tray, is placed back on the tray at a lower level when it is intended to seal the open side of the tray, wherein, in a direction of the height, overlap is present between the tray and the cover rim in order to enable an engagement of the cover rim on the tray. The lower level of the cover after the first use does not constitute a problem when it is assumed that the content of the package has decreased with the first use because a portion of the content has been removed in order to be consumed. This is especially the case when the package is used for packing food products, for example, for packing mushrooms, grapes or strawberries.

In the situation in which the breaking portion is broken during the manufacturing process, connecting the piece of cover foil to at least the cover rim can be done simultaneously with detaching the cover rim from the tray, but possibly also only after the cover rim and the tray have been detached from each other and the mutual movement has ended, or prior to that.

The mutual movement of the cover rim and the tray which is aimed at detaching the cover rim of the tray, wherein the breaking portion is broken, can be ended when a surface of the cover rim and a circumferential surface of the tray, which is located at the open side of the tray, are located at a substantially equal level. When the tray is being considered in the aforementioned normal orientation, in which the open side of the tray and of the cover rim can be said to be located at an upper side, the circumferential surface of the tray can be understood such as to mean a ring-shaped surface at the upper side of the tray. It is practical when the design of the package is chosen to have concentric upper surfaces of the cover rim and the tray, so that it is possible to put these upper surfaces to a substantially equal level in order to obtain a usable supporting surface for a portion of the piece of cover foil at the circumference of the piece. In that situation, the connection as desired between the cover foil and at least the cover rim can be realized. That does not alter the fact that it is also possible to establish the desired connection as mentioned already at an earlier stage, as has already been described in the foregoing.

In the case of a breaking portion which has already been broken, when it is desired to have a fixed connection between the tray, the cover rim and the piece of cover foil prior to first use, in order to prevent the cover, i.e. the combination of the cover rim and the piece of cover foil, from getting detached from the tray unintendedly, and to guarantee a durable sealing of the internal space of the tray from the outside world, it is possible that the piece of cover foil is connected to both the tray and the cover rim. In that case, a stronger connection between the piece of cover foil and the cover rim than between the piece of cover foil and the tray can be realized, so that the piece is cover foil automatically detaches from the tray and not from the cover rim when a user detaches the foil at first use.

The limited mutual movement of the cover rim and the tray, which is forced for the purpose of detaching the cover rim and the tray from each other, can be a linear movement. Such a movement can be performed in a simple manner. For example, in a practical case, it can be so that the cover rim is moved downwards only a small bit with respect to the tray. Furthermore, it is a practical possibility that the mutual movement of the cover rim and the tray is ended with establishing a clamping connection between the cover rim and the tray. In that case, a manufacturing process of the package according to the invention in which the clamping connection is already being established comprises the following steps: forming the package as an entirety of tray, cover rim and breaking portion, forcing a mutual movement of the tray and the cover rim until they are clamped one on the other, wherein the breaking portion is broken, and providing the piece of cover foil and attaching the cover foil to at least the cover rim.

On the basis of the aforementioned possibility of having an inward bulge along at least a portion of the circumference of the inner ring of the cover rim, there is no need for a formation of further components which are adapted to establish a clamping connection between the cover rim and the tray in case of a mutual movement of the cover rim and the tray. The cover rim can be moved over the tray until the bulge of the cover rim has reached a position beyond the outer circumferential rim of the tray. When the package is made of plastic, the flexibility which is needed in the process is present to a sufficient extent.

For establishing the connection between the piece of cover foil and at least the cover rim, any suitable technique for letting two components get attached to each other can be applied. For instance, it is possible to provide for local supply of heat, so that the components get connected to each other as they melt at the location in question. It can be advantageous to apply means for supporting at least the cover rim during establishment of the connection between the piece of cover foil and at least the cover rim.

The package which is manufactured by means of the method according to the invention can be applied for packing various materials. As has been noted earlier, packing food products is surely one of the possibilities. In general, the material to be packed is placed inside the tray before the piece of cover foil is connected to at least the cover rim.

The invention also relates to a package which can be manufactured by applying the above-described method. Hence, according to a first aspect of the invention, it is about a package, comprising an entirety of a tray having an open side and a ring-shaped cover rim which is located at the open side of the tray, at an outer circumferential rim of the tray, and which is connected to the tray through a relatively weak breaking portion, which entirety has been formed on the basis of a sheet, and wherein the cover rim has an inner ring in which an inward bulge is present along at least a portion of the circumference thereof. Furthermore, the package can be completed with a piece of cover foil which is connected to the cover rim and seals the tray, wherein in practice, material is present in the tray.

According to a second aspect of the invention, a package is provided which comprises an entirety of a tray having an open side and a ring-shaped cover rim which is located at the open side of the tray, and which is connected to the tray through a clamping connection, which entirety has been formed on the basis of a sheet, wherein the cover rim and the tray are detached from each other, wherein the cover rim has an inner ring in which an inward bulge is present along at least a portion of the circumference thereof, and wherein the bulge is located underneath an outer circumferential rim of the tray. The bulge has a function in guaranteeing an effective clamping connection between the cover rim and the tray, as has been described in the foregoing.

The package as defined in the foregoing can be further completed with a piece of cover foil which is connected to at least the cover rim and seals the tray, wherein in practice, material is present in the tray. A surface of the cover rim and a circumferential surface of the tray which is present at the open side of the tray can be located at a practically equal level. This is especially advantageous with respect to an embodiment of the package in which the piece of cover foil is connected to both the tray and the cover rim, wherein the piece of cover foil can be positioned on the package in a planar fashion. As has been noted earlier, with a double connection of the cover foil, it is advantageous when a connection between the piece of cover foil and the cover rim is stronger than a connection between the piece of cover foil and the tray, so that it can be guaranteed that the cover remains intact when the package is opened for a first time.

Furthermore, the invention relates to a mold for application for the purpose of the above-described method, i.e. the method for manufacturing a package comprising an entirety of a tray having an open side and a ring-shaped cover rim which is located at the open side of the tray, at an outer circumferential rim of the tray, and which is connected to the tray through a relatively weak breaking portion, on the basis of a sheet which is placed in the mold. In particular, the mold is adapted to allow for a forced movement of the sheet in two different directions.

In a practical embodiment, the mold according to the invention comprises means for clamping the sheet along a ring-shaped portion. Also, the mold can be adapted to form the cover rim with an inner ring and arranging an inward bulge therein, along at least a portion of the circumference thereof. The mold can comprise a number of separate elements, including a first forming element having a forming surface which is shaped according to an under surface of the tray, and a second forming element having a forming surface which is shaped according to an upper surface of the cover rim, each of these elements being destined for placement at another side of the sheet. Furthermore, the mold can comprise a movably arranged punching knife for surrounding the first forming element. It is advantageous when the punching knife is serrated, as has been elucidated earlier. Furthermore, the mold can comprise means for applying pressure difference over the sheet and can thereby be suitable for vacuum forming or thermo forming the sheet.

The invention will be explained in more detail on the basis of the following description of a method for manufacturing a package, wherein a sheet is made into an entirety of a tray and a cover rim with a relatively weak breaking portion therebetween, in a mold, particularly by deforming the sheet, wherein a movement of the sheet is forced in two different directions, and wherein the tray is sealed by applying a piece of cover foil, possibly no earlier than when the breaking portion has been broken first. Reference will be made to the drawing, in which equal reference numerals indicate equal or similar components, and in which:

Figure 1:
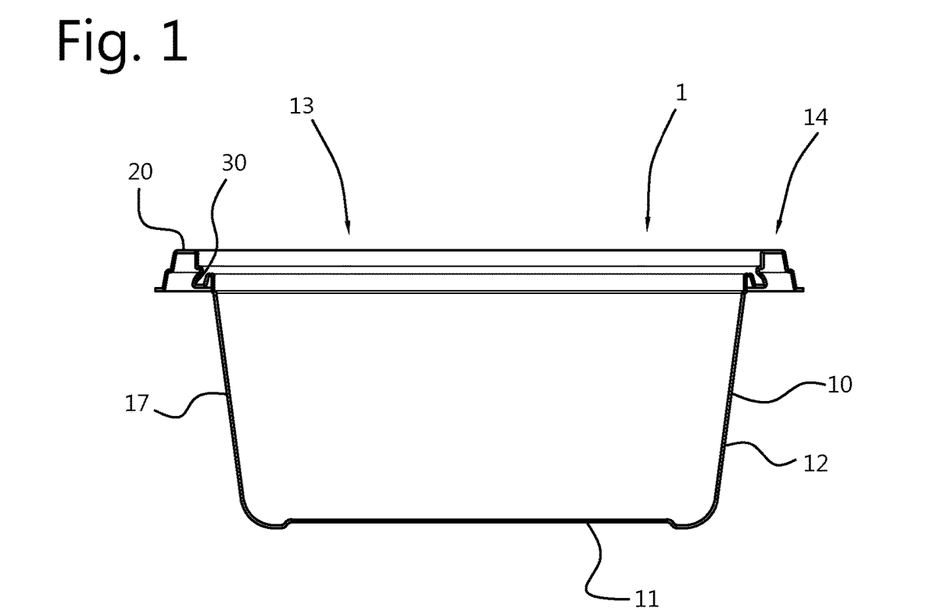
FIG. 1 diagrammatically shows a cross-section of a package according to the invention.
Figure 2:
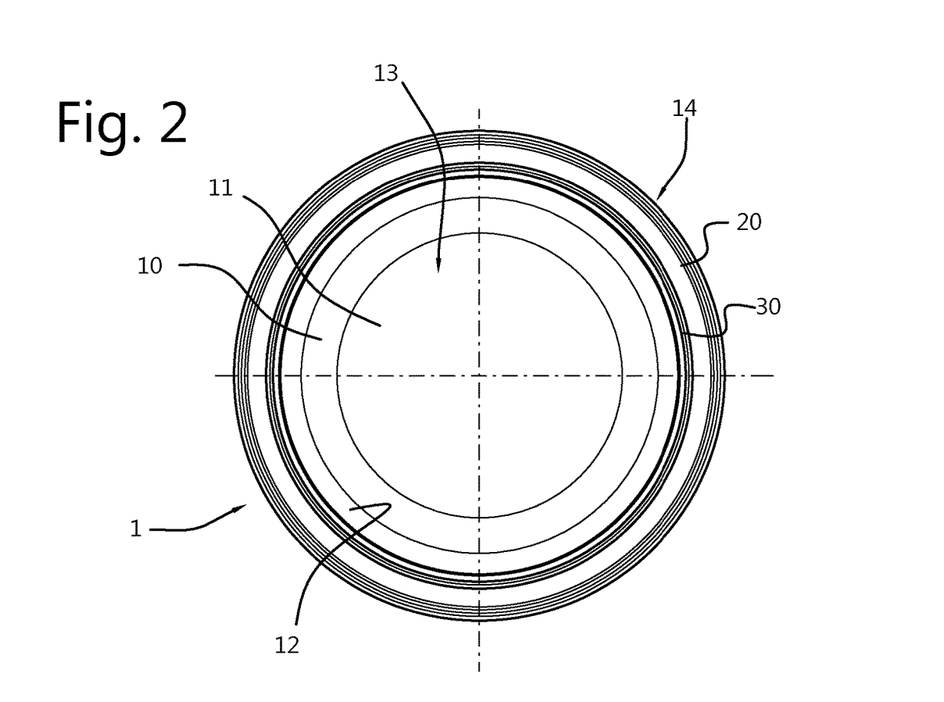
FIG. 2 diagrammatically shows a top view of the package.

FIGS. 1 and 2 show a package 1 according to the invention, which is completely made of plastic in a preferred embodiment, and which comprises an entirety of a tray 10, a cover rim 20 and a relatively thin breaking portion 30 between the tray 10 and the cover rim 20. In the shown example, the tray 10 has a bottom 11 and a standing wall 12 extending from the bottom 11, and having a substantially circular circumference. In the framework of the invention, arbitrary shapes of the tray 10 are possible, wherein the tray 10 at least has an open side 13. In the following description, a normal orientation of the tray 10 will be assumed, i.e. an orientation in which the bottom 11 of the tray 10 is at the under side, and in which the open side 13 is at the upper side. At the open side 13, along the entire circumference, the tray 10 is provided with a specially designed rim portion 14 having an upper surface 15, which is a circumferential surface of the tray 10, as can clearly be seen in the detail of the package 1 shown in FIG. 3. The function of the rim portion 14 will be elucidated in the following.

The cover rim 20 is ring-shaped and completely surrounds the tray 10 at the open side 13, wherein the cover rim 20 is fixedly connected to the tray 10, at an outer circumferential rim 16 of the tray 10. The shape of the circumference of the cover rim 20 is adapted to the shape of the circumference of the tray 10. Thus, the ring shape of the cover rim 20 can be circular, but, for example, can also be rectangular or square, depending on the shape of the circumference of the tray 10. For the sake of completeness, it is noted that where the terms "inner" and "outer" are used in this text, these terms need to be understood such as to be related to a central axis (axis of symmetry) of the ring-shaped cover rim 20, wherein a position is more to the inside when this position has a shorter radial distance to the said axis, and wherein a position is more to the outside when this position has a longer radial distance to the said axis.

Figure 4:
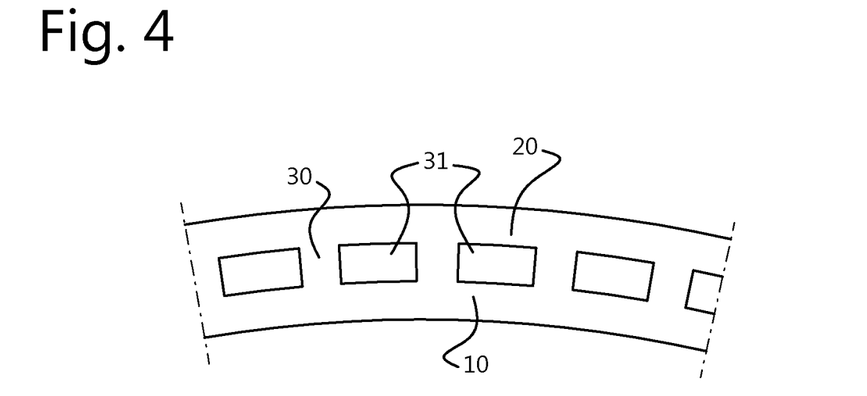
FIG. 4 diagrammatically shows a part of a breaking portion between a tray and a cover rim of the package.

Between the cover rim 20 and the tray 10, the breaking portion 30 is present. FIG. 4 illustrates the fact that the breaking portion 30 can be perforated, so that it may be so that there is a mutual connection between the tray 10 and the cover rim 20 along the entire circumference of the tray 10 and the cover rim 20, but there are also interruptions 31 at defined places. As a consequence, an action of breaking the breaking portion 30, as will be described in the following, requires a minimum force.

Figure 3:
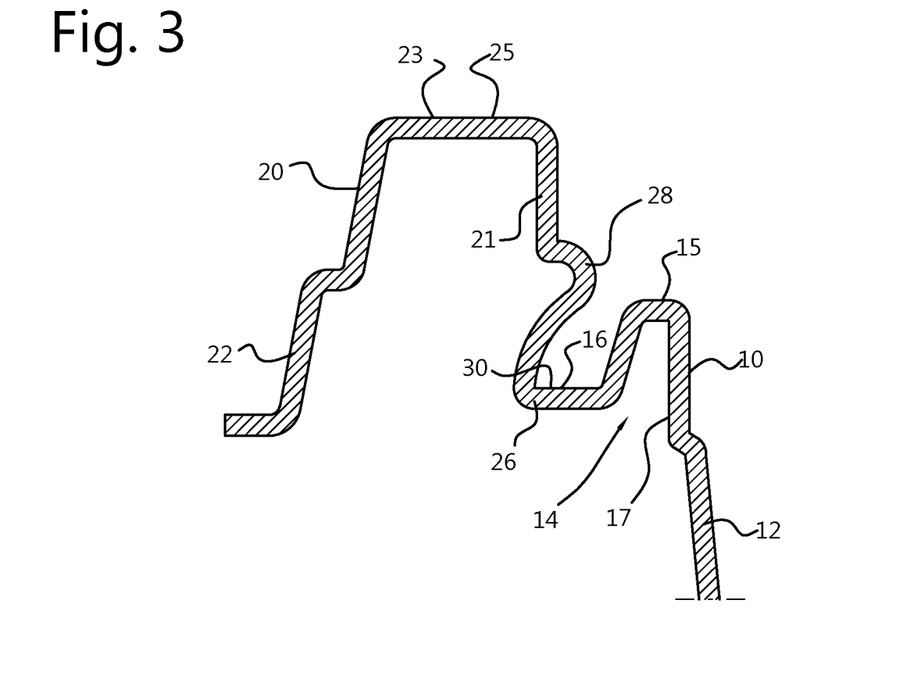
FIG. 3 diagrammatically shows a cross-section of a detail of the package.

The cover rim 20 has an inner ring 21 and an outer ring 22, which has a stepped configuration in this example. In the inner ring 21, a bulge is present which is directed inwardly. In the framework of the invention, the bulge 28 can be present along the entire circumference of the inner ring 21, but it is also possible that the inner ring 21 is provided with a bulge 28 at a number of defined positions. The functions of the rings 21, 22 of the cover rim 20 and of the bulge 28 in the inner ring 21 will be elucidated in the following. As seen in the normal orientation of the entirety 1 of the tray 10 and the cover rim 20, the rings 21, 22 of the cover rim 20 extend substantially in a vertical, downward direction.

Figure 5:
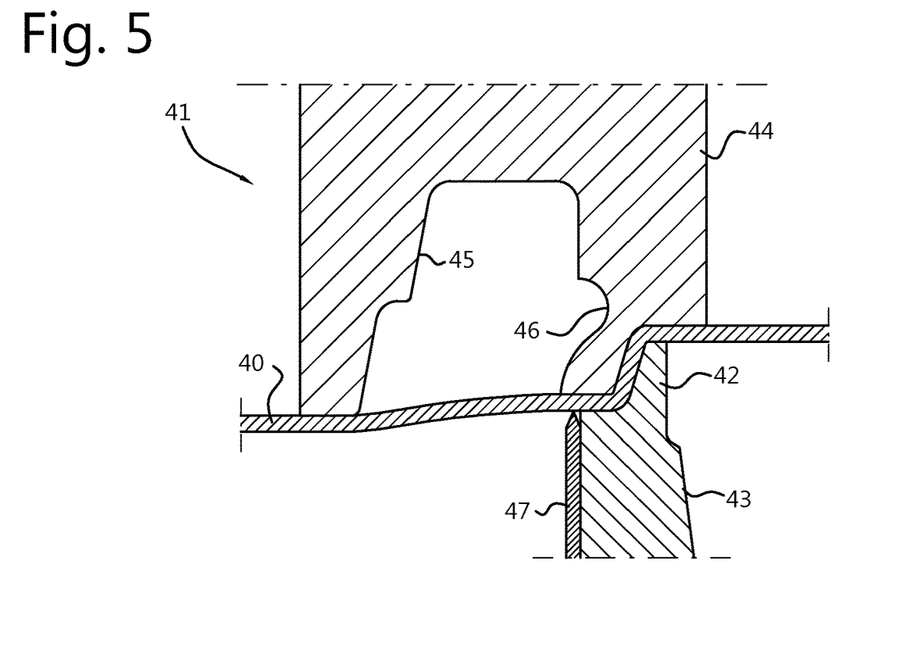
FIG. 5 diagrammatically shows a cross-section of a part of a mold and a part of a sheet which is formed as the package by applying the mold, with the sheet in an initial condition.
Figure 6:
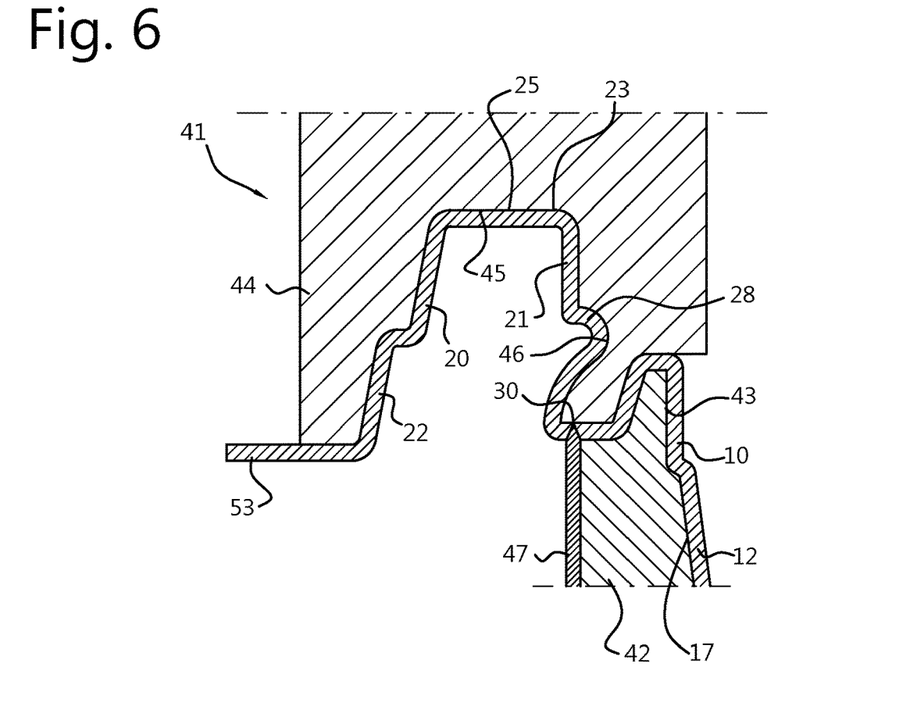
FIG. 6 diagrammatically shows a cross-section of a part of the mold and a part of the sheet, with the sheet in a deformed condition.

On the basis of FIGS. 5 and 6, a manufacturing process of the package 1 is elucidated. In the shown example, a plastic sheet 40 in planar condition constitutes the basis of the package 1. A part of this sheet 40 is shown in FIGS. 5 and 6. Furthermore, in the said figures, a part of a mold 41 can be seen which is applied for the purpose of the manufacturing process in which the sheet 40 is deformed. The mold 41 comprises a first forming element 42 having a forming surface 43 which is shaped according to an under surface 17 of the tray 10. The mold 41 furthermore comprises a second forming element 44 having a forming surface 45 which is shaped according to an upper surface 23 of the cover rim 20. In the forming surface 45 of the second forming element 44, a recess 46 is arranged for the purpose of forming the bulge 28 in the inner ring 21 of the cover rim 20. Depending on the desired embodiment of the bulge 28, along the entire circumference of the inner ring 21, or not, the recess 46 is continuous along the entire circumference of the second forming element 44, or not.

The first forming element 42 is surrounded by a movably arranged tubular punching knife 47. The first forming element 42 and the punching knife 47 have a concentric arrangement with respect to each other. In the shown example, the punching knife 47 is movable in vertical direction. In a general sense, the punching knife 47 is movable in longitudinal direction of the tubular shape thereof. At a functional side, i.e. a side facing the sheet 40 and serving to realize the defined interruptions 31 of the breaking portion 30, the punching knife 47 is serrated.

For the purpose of forming the sheet 40 as the package 1 as desired, the sheet 40 is placed in the mold 41, wherein the first forming element 42 is situated under the sheet 40, while the second forming element 44 is situated above the sheet 40. Portions of the first forming element 42 and the second forming element 44 are situated opposite to each other, so that a ring-shaped portion of the sheet 40 can be clamped between the first forming element 42 and the second forming element 44, by pressing the first forming element 42 and the second forming element 44 towards each other, for example, by moving the first forming element 42 vertically upward and the second forming element 44 vertically downward in the shown example. At the position where the first element 42 and the second forming element 44 are pressed against each other, with the sheet 40 therebetween, the relevant portion of the sheet 40, which corresponds to the rim portion 14 of the tray 10 in the shown example, is already formed. At opposite sides of this portion of the sheet 40, other portions of the sheet 40 extend in a more or less horizontal direction, in planar condition. This initial condition of the sheet 40 is shown in FIG. 5.

The sheet 40 is inserted in the mold 41 in heated condition. Subsequently, in the mold 41, an overpressure is created in two different directions. At the position of the first forming element 42, an overpressure is prevailing at the upper side of the sheet 40, so that at that position, a portion of the sheet 40 is moved in a substantially downward direction towards the forming surface 43 of the first forming element 42 and is put into contact therewith, as a result of which the tray 10 of the package 1 is realized. On the other hand, at the position of the second forming element 44, an overpressure is prevailing at the under side of the sheet 40, so that at that position, a portion of the sheet 40 is moved in a substantially upward direction to the forming surface 45 of the second forming element 44 and is put into contact therewith, as a result of which the cover rim 20 of the package 1 is realized. In the process, it is also possible that at the position of the first forming element 42, underpressure is prevailing at the under side of the sheet 40 and/or that at the position of the second forming element 44, underpressure is prevailing at the upper side of the sheet 40. The final condition of the sheet 40 is shown in FIG. 6. It is noted that a process by means of which the sheet 40 is deformed is known as vacuum forming or thermo forming. In a manner known per se, for the purpose of creating the said overpressures and underpressures, respectively, the mold 41 can be provided with openings (not shown) at appropriate positions, through which compressed air, for example, can be introduced in the mold 41, and through which air can be sucked out in order to create a vacuum, respectively. It is important that the portions of the first forming element 42 and the second forming element 44 facing each other are firmly pressed against each other during the forming process of the package 1, in order to prevent leakage between the areas of the mold 41 in which pressure is exerted in different directions and deformation of the sheet takes place, which would lead to disturbance of the forming process.

The punching knife 47 is pressed in the sheet 40 in order to realize a desired pattern of interruptions 31 at the position of the breaking portion 30. The design of the first forming element 42 and the second forming element 44 is aimed at providing the sheet 40 with a substantially U shaped appearance at the position of the breaking portion 30, wherein, in that case, the breaking portion 30 is arranged in the basis of the U shape. In particular, the U shape has an upright orientation, which implies that an under side of the sheet 40 is convex and an upper side of the sheet 40 is concave at that position.

Once the sheet 40 has been deformed and has been slit by applying the punching knife 47 in the way as described in the foregoing, the package 1 is actually ready, especially when a step is carried out which is aimed at detaching the package 1 from a piece 53 of the sheet 40 surrounding the cover rim 20. This step can be carried out in the mold 41, wherein the step can be carried out simultaneously with the slitting action of the punching knife 47 in order to realize a very efficient manufacturing process of the package 1. The detaching step can be realized by means of a punching process, wherein a punching tool (not shown) is applied and is moved through the sheet 40 at an appropriate position, so that a cut is made at the appropriate position.

Figure 7:
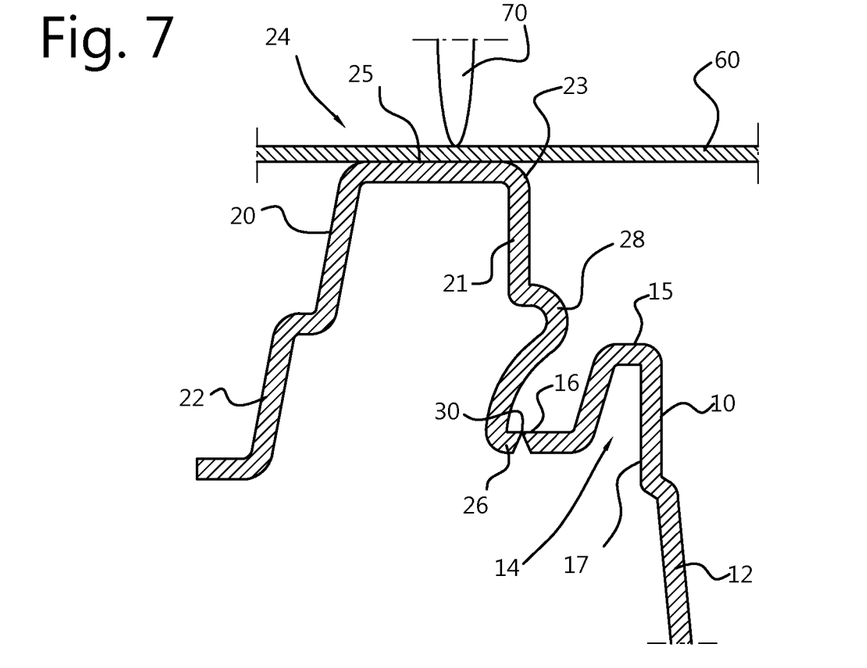
FIG. 7 illustrates how a piece of cover foil is connected to the cover rim of the package.

As soon as the package 1 has been formed, preferably in the way as described in the foregoing, a next production step can be carried out, which is illustrated in FIG. 7. This next production step is aimed at providing and arranging a piece of cover foil 60 for sealing the open side 13 of the tray 10, and forming a complete cover 24 along with the cover rim 20.

In the mutual position assumed by the rim portion 14 of the tray 10 and the cover rim 20 with respect to each other when the breaking portion 30 is intact, an upper surface 25 of the cover rim 20 extends at a higher level than the upper surface 15 of the rim portion 14 of the tray 10. In this way, the upper surface 25 of the cover rim 20 can support the piece of cover foil 60 at the circumference. When it is desired to apply the piece of cover foil 60 in this situation, the piece of cover foil 60 is connected to the cover rim 20 only, preferably along the entire circumference of the upper surface 25 of the cover rim 20. By doing so, it is achieved that the tray 10 is sealed, and that also the cover 24 is composed, wherein a firm connection is present between the piece of cover foil 60 and the cover rim 20. The piece of cover foil 60 is at a higher level than the upper surface 15 of the rim portion 14 of the tray 10, which is advantageous in respect of packing food products such as mushrooms, grapes or strawberries, because in that case, the tray 10 can be filled all the way to the top without the cover foil 60 pressing against the content once the content has been supplied.

A possibility for establishing the connection between the piece of cover foil 60 and the cover rim 20 is locally supplying heat, so that the cover foil 60 melts to the cover rim 20 at a defined place. This can be done in a manner known per se with the help of appropriate tools 70, which are usually referred to as sealing knives, of which a portion is diagrammatically shown in FIG. 7. It can be advantageous to support the cover rim 20, and possibly also the rim portion 14 of the tray 10, during the connection process. In that case, to this end, a suitable support is applied, which can be movably arranged.

The assembly of the tray 10 and the cover 24 is destined to be used for packing materials (not shown), which are placed in the tray 10 at any suitable moment prior to applying the piece of cover foil 60. In particular, the materials may comprise food products, such as mushrooms, grapes and strawberries as mentioned earlier, and also, for example, salads, nuts, butter and other dairy products such as yoghurt. It is possible for the sealing of the tray 10 to take place in a protective atmosphere, or under other desired conditions.

Figure 8:
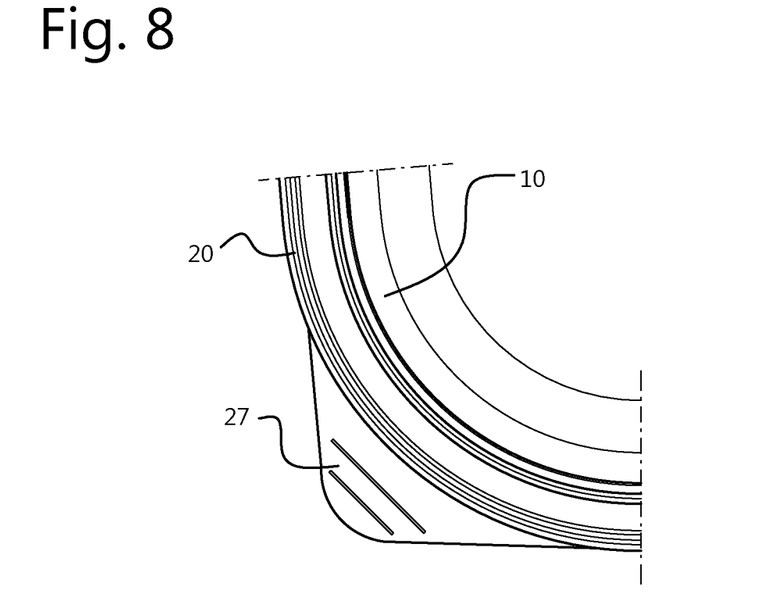
FIG. 8 diagrammatically shows a top view of a portion of the package having a possible tearing lip at the cover rim thereof.

In the shown example, the assembly of the tray 10 and the cover 24 is ready for first use after applying the piece of cover foil 60. In that first use, a user takes hold of the cover rim 20 at a place on the stepped outer ring 22, and exerts forces on the cover rim 20 which are aimed at breaking the breaking portion 30, so that an inner circumferential rim 26 of the cover rim 20 gets detached from the outer circumferential rim 16 of the tray 10, after which the cover 24 can be removed from the tray 10. The cover rim 20 can be provided with at least one tearing lip 27 as illustrated in FIG. 8, which can easily be taken hold of by the user.

Figure 9:
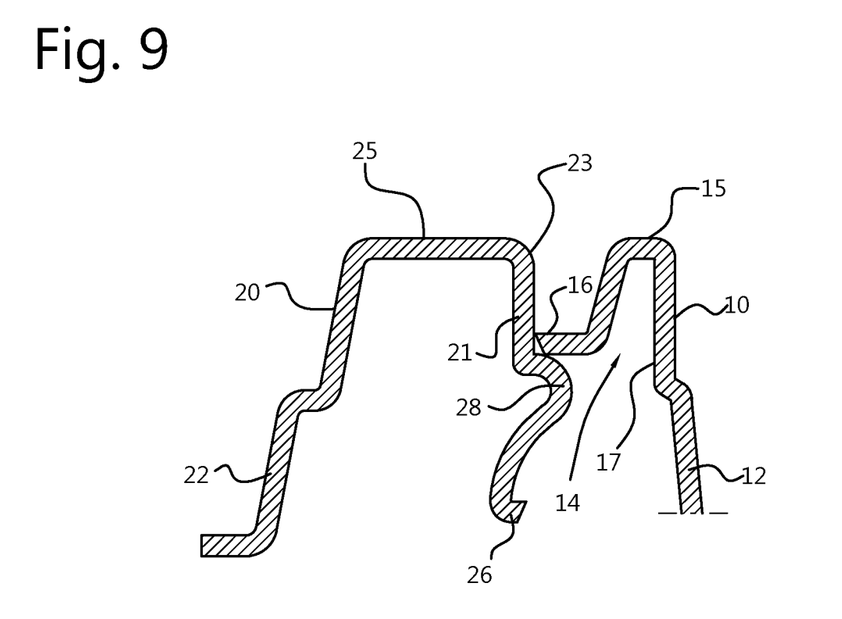
FIG. 9 shows a detail of the package for a condition of the package in which the breaking portion has been broken and a detachable clamping connection between the tray and the cover rim has been established.

After the first use, the user can close the tray 10 again by placing the lid 24 back on the tray 10, and exerting a light downward pressure in the process, wherein a clamping connection between the cover 24 and the tray 10 can be established. A possible mutual position of the tray 10 and the cover rim 20 in that case is shown in FIG. 9. In this position, the cover rim 20 engages with the rim portion 14 of the tray 10, wherein, in vertical direction, the inner circumferential rim 26 of the cover rim 20 cannot move beyond the outer circumferential rim 16 of the tray 10 just like that, in view of the fact that there is a clamping action between a higher portion of the inner ring 21 of the cover rim 20 and the outer circumferential rim 16 of the tray 10. The steps of opening the tray 10 again by breaking the clamping connection and removing the cover 24, and closing the tray 10 again by putting the cover 24 in place on the tray 10 and establishing the clamping connection, can be repeated according to liking, as often as desirable.

The bulge 28 in the inner ring 21 of the cover rim 20 has a function in establishing the clamping connection, wherein the cover rim 20 at the position of the inner ring 21 on the upper surface 23 thereof centers on the rim portion 14 of the tray 10, and wherein wrong positioning of the cover rim 20 is prevented and a complete sealing of the tray 10, which can easily be broken again, is realized. When the clamping connection between the tray 10 and the cover rim 20 is a fact, the outer circumferential rim 16 of the tray 10 is situated directly above the bulge 28. There is no need for additional aspects of the design of the package 1, such as projections, recesses, or the like, in order to enable a clamping connection. Instead, the outer circumferential rim 16 of the tray 10 and the inner ring 21 of the cover rim 20 are at a level directly above the bulge 28 after breaking the breaking portion 30 automatically suitable for clamping against each other. A clamping connection is established by pressing the cover rim 20 downwardly on the tray 10, wherein at least the inner ring 21 of the cover rim 20 springs inwardly to some extent and is in contact with the outer circumferential rim 16 of the tray 10. In order to enhance the effect, the inner ring 21 can be designed in such a way that it defines a decreasing inner space, which is the case up to and including the bulge 28 in the shown example. For the purpose of detaching a clamping connection, a user can take hold of a portion of the cover rim 20 at the outer ring 22 in a first instance, and use that portion to tilt the inner ring 21 away from the outer circumferential rim 16 of the tray 10.

As an alternative of the method for applying a piece of cover foil 60 to the package 1 in order to seal the tray 10 as described in the foregoing, it is possible that the cover rim 20 is put to a lower level with respect to the tray 10 first, wherein the breaking portion 30 is broken, so that the mutual position of the cover rim 20 and the tray 10 as show in FIG. 9 is obtained, i.e. a mutual position in which the upper surface 15 of the rim portion 14 of the tray 10 and the upper surface 25 of the cover rim 20 are at a substantially equal level. In the following, it is described how the process is further carried out in that case.

Figure 10:
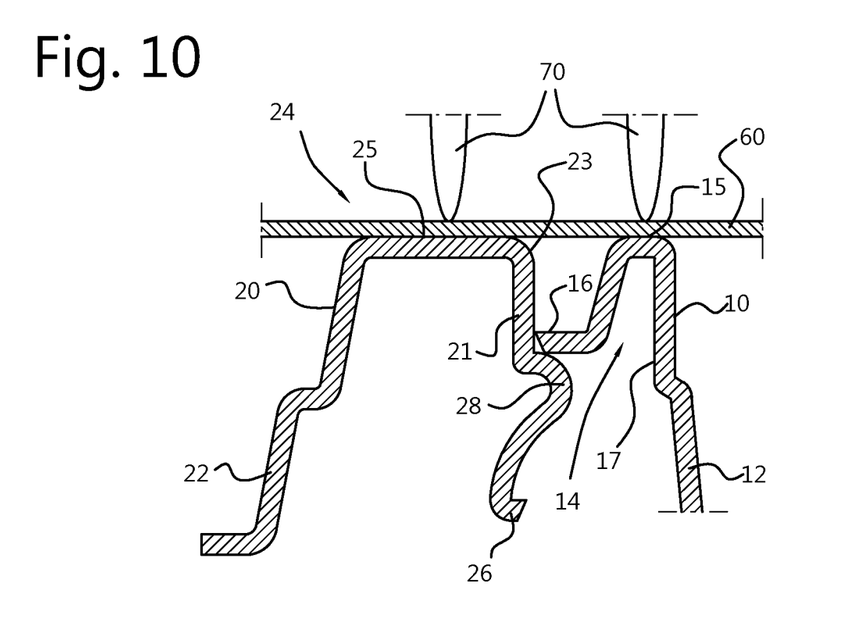
FIG. 10 illustrates how in the condition of the package shown in FIG. 9, a piece of cover foil is connected to both the tray and the cover rim.

In a first step, a downward pressure is exerted on the cover rim 20, wherein the breaking portion 30 is broken completely, and the cover rim 20 gets detached from the tray 10 as a result thereof. At a certain point during the downward movement of the cover rim 20, the clamping connection between the cover rim 20 and the tray 10, as described in the foregoing, is established. The downward movement is stopped when the upper surface 15 of the rim portion 14 of the tray 10 and the upper surface 25 of the cover rim 20 are at a substantially equal level. At that point, a next production step can be carried out, as illustrated in FIG. 10. This next production step is aimed at providing and applying a piece of cover foil 60 for sealing the open side 13 of the tray 10, and constituting a complete cover 24 along with the cover rim 20.

Due to the fact that the upper surface 15 of the rim portion 14 of the tray 10 and the upper surface 25 of the cover rim 20 extend at a substantially equal level, both upper surfaces 15, 25 as mentioned can support the piece of cover foil 60 at the circumference. In the shown example, the piece of cover foil 60 is connected with the package 1 at two places, namely to the upper surface 15 of the rim portion 14 of the tray 10, along the entire circumference, and to the upper surface 25 of the cover rim 20, also along the entire circumference. As a consequence, it is achieved that the tray 10 is sealed in an airtight fashion, and that also the cover 24 is composed, wherein a firm connection is present between the piece of cover foil 60 and the cover rim 20.

It is possible to already connect the piece of cover foil 60 to the upper surface 25 of the cover rim 20 at an earlier stage. This is even possible during the mutual movement of the tray 10 and the cover rim 20 which is carried out in order to realize the clamping connection and to put the aforementioned upper surfaces 15, 25 to a substantially equal level. In that case, advantages are that the manufacturing process can be faster, and that the cover rim 20 can surely not move beyond the desired position with respect to the rim portion 14 of the tray 10. The connection between the piece of cover foil 60 and the tray 10 can usually be less strong (can usually be peelable to a much higher extent) than the connection between the piece of cover foil 60 and the cover rim 20. In that case, establishing the latter connection requires more time than establishing the first connection. In that case, time can be saved when the connection which requires more time, is already realized during the mutual movement of the tray 10 and the cover rim 20, at least partially, as a result of which the costs of the manufacturing process can be lower. For the sake of completeness, it is noted that it is furthermore practical to establish the connection between the piece of cover foil 60 and the cover rim 20 at a higher temperature than the connection between the piece of cover foil 60 and the tray 10.

In conformity with what has been noted earlier, locally supplying heat is a possibility for establishing the connections between the piece of cover foil 60 and the tray 10 and the cover rim 20, so that the cover foil 60 melts to the tray 10 and the cover rim 20 at defined places. This can be done in a manner known per se with the help of appropriate tools 70, of which a portion is diagrammatically shown in FIG. 10. It can be advantageous to support the cover rim 20, and possibly also the rim portion 14 of the tray 10, during the connection process. In that case, to this end, a suitable support is applied, which can be movably arranged.

In respect of applying the cover foil 60 in the situation in which the breaking portion 30 is already broken, it is possible to choose in favor of establishing only a connection between the cover foil 60 and the cover rim 20. Apart from that, it is true in respect of both this connection and the possible connection between the cover foil 60 and the rim portion 14 of the tray 10 that the connection does not necessarily need to be present along the entire circumference. However, in view of the desire to obtain a robust cover 24, wherein the cover rim 20 and the piece of cover foil 60 cannot be easily pulled away from each other, a complete connection between the piece of cover foil 60 and the cover rim 20 is preferred. In general, the fact is that the places where a connection needs to be established can be determined according to desire, wherein it is important to take into account a possible desire to completely seal the internal space of the tray 10.

In the shown example, the assembly of the tray 10 and the cover 24 is ready for first use after applying the desired connections. In that first use, a user takes hold of the cover rim 20 at a place on the outer ring 22, breaks the clamping connection between the cover rim 20 and the tray 10, and pulls the cover 24 away from the tray 10, wherein the connection between the cover foil 60 and the tray 10 gets broken, while the connection between the cover foil 60 and the cover rim 20 remains intact. When the piece of cover foil 60 is connected to both the tray 10 and the cover rim 20 during the manufacturing process of the assembly, it is possible to choose in favor of letting the connection to the tray 10 be less strong (be peelable to a much higher extent) than to the cover rim 20, as has been noted earlier, so that it is guaranteed that only the connection between the piece of cover foil 60 and the tray 10 is broken.

Important advantages of the above-described assembly of the tray 10 and the cover 24 and the way in which it can be manufactured are summed up in the following.

The assembly is suitable for packing food products which need to be packed in an airtight manner prior to first use, because it is possible for a connection between the piece of cover foil 60 and the tray 10 to be established along the entire circumference.

For the purpose of sealing the tray 10 prior to the first use, there is no need for a separate piece of cover foil which does no longer have a function after the first use, different from what is the case in many conventional situations. As a consequence, the assembly is more environmentally friendly. Because the piece of cover foil 60 is integrated in the cover 24, a relatively light cover 24 is obtained, wherein material has been saved.

The tray 10 and the cover rim 20 which is part of the cover 24 can be manufactured in a relatively simple and cheap way by means of vacuum forming or thermo forming, starting with a planar sheet 40 and using a mold 41. The cover rim 20 is immediately in the correct position with respect to the tray 10, possibly after breaking a relatively thin breaking portion 30 between the tray 10 and the cover rim 20. There is no need for having a separate manufacturing process of the cover 24, and there is no need for an additional step for positioning the cover 24 on the tray 10.

The assembly can easily be manipulated by a user, wherein, in first use, the cover 24 can be easily pulled away from the tray 10, and wherein, in further use, a clamping connection between the cover 24 and the tray 10 can easily be established or broken, over and over again.

It will be clear to a person skilled in the art that the scope of the invention is not limited to the examples discussed in the foregoing, but that several variations and modifications thereof are possible without deviating from the scope of the invention as defined in the attached claims.

In respect of the piece of cover foil 60, it is noted that it can be manufactured from any suitable material, for example, plastic or aluminium. Also, the piece of cover foil 60 can be provided with a print, for example, for information purposes and/or advertisement purposes.

In respect of the term "punching knife" as used in the foregoing, it is noted that in the framework of the invention, it needs to be understood in a broad sense, i.e. as tool which is capable of locally realizing one or more interruptions or at least weakenings. Instead of a singular, tubular punching knife 47, it is also possible that a composed knife is applied. In respect of each of the forming elements 42, 44 of the mold 41, it is true that the forming element 42, 44 can be composed of two or more pieces in a manner known per se if so desired, wherein one or more of such pieces can be slidably arranged when such is desirable in practice in order to enable or at least facilitate release of the package 1 from the mold 41.

The cover rim 20 does not necessarily need to be formed with both an inner ring 21 and an outer ring 22. In view of the desired possibility of clamping the cover rim 20 on the tray 10, it is advantageous when the cover rim 20 is formed with at least an inner ring 21, wherein, in that case, the bulge 28 can also be present, which in combination with the clamping connection guarantees a correct positioning of the cover rim 20 with respect to the tray 10 without a user of the package 1 needing to pay special attention to the positioning.

The fact that the processes of vacuum forming or thermo forming can be carried out in two different directions and the fact that it is possible to realize a bulge 28 in the inner ring 21 of the cover rim 20 can be applied independently from each other. Therefore, the invention also relates to a method for manufacturing a package 1 comprising an entirety of a tray 10 having an open side 13 and a ring-shaped cover rim 20 which is located at the open side of the tray 10, at an outer circumferential rim 16 of the tray 10, and which is connected to the tray 10 through a relatively weak breaking portion 30, wherein a mold 41 is provided, wherein a sheet 40 is provided and is placed in the mold 41, and wherein the cover rim 20 is formed with an inner ring 21 in which an inward bulge 28 is realized, along at least a portion of the circumference thereof. Therefore, the invention furthermore relates to a mold 41 for application for the purpose of a method for manufacturing a package 1 comprising an entirety of a tray 10 having an open side 13 and a ring-shaped cover rim 20 which is located at the open side 13 of the tray 10, at an outer circumferential rim 16 of the tray 10, and which is connected to the tray 10 through a relatively weak breaking portion 30, on the basis of a sheet 40 which is placed in the mold 41, wherein the mold 41 is adapted to form the cover rim 20 with an inner ring 21 and to realize an inward bulge 28 therein, along at least a portion of the circumference thereof. In particular, the mold can comprise a forming element 44 having a forming surface 45 which is provided with a recess 46 for the purpose of forming the said bulge 28.

The invention can be summarized as follows. A package 1 comprises an entirety of a tray 10 having an open side 13 and a ring-shaped cover rim 20 which is located at the open side 13 of the tray 10, at an outer circumferential rim 16 of the tray 10, and which is connected to the tray 10 through a relatively weak breaking portion 30. For the purpose of manufacturing the package 1, a mold 41 having a number of separate elements 42, 44, 47 is provided. Also, a sheet 40 is provided and placed in the mold 41, wherein a movement of the sheet 40 is forced in two different directions in order to form the sheet 40 as the package 1 having the tray 10 and the cover rim 20. By applying a punching knife 47, the sheet 40 is slit in order to realize the breaking portion 30 of the package 1. Also, the package 1 is detached from surrounding material 53 of the sheet 40. Furthermore, a piece of cover foil 60 is provided and connected to at least the cover rim 20.

The breaking portion 30 can be broken prior to applying the piece of cover foil 60, but that is not necessary. In any case, the cover rim 20 and the tray 10 are preferably adapted to be put in engagement with each other through a clamping connection after they no longer constitute an integral whole with each other through the breaking portion 30. The cover rim 20 can be formed with an inner ring 21 in which an inward bulge 28 is realized, along at least a portion of the circumference thereof, as an aids in establishing a clamping connection between the cover rim 20 and the tray 10 once the cover rim 20 has been broken away from the tray 10, wherein a correct positioning of the cover rim 20 on the tray 10 is guaranteed.

The invention claimed is:

1. A method for manufacturing a package comprising an entirety of a tray having an open side and a ring-shaped cover rim which is located at the open side of the tray, at an outer circumferential rim of the tray, and which is connected to the tray through a relatively weak breaking portion, wherein a mold is provided, wherein a sheet is provided and is placed in the mold, and wherein a movement of the sheet is forced in two different directions for forming the sheet as the package having the tray and the cover rim, wherein the sheet is clamped along a ring-shaped portion, and wherein a portion of the sheet inward of the ring-shaped portion and a portion of the sheet outward of the ring-shaped portion are moved in the two different directions; and wherein the forming movements of the sheet in the mold as desired are realized by applying gas pressure differences over the sheet in two different directions in the mold.

2. The method according to claim 1, wherein the sheet is forced to perform the movements in the two different directions simultaneously.

3. The method according to claim 1, wherein the cover rim is formed with an inner ring in which an inward bulge is arranged, along at least a portion of the circumference thereof.

4. The method according to claim 1, wherein the mold comprises a number of separate elements, including a first forming element having a forming surface which is shaped according to an under surface of the tray and a second forming element having a forming surface which is shaped according to an upper surface of the cover rim, wherein the sheet is placed in the mold with the first forming element at one side of the sheet and the second forming element at the other side of the sheet, wherein the sheet is clamped between portions of the first forming element and the second forming element facing each other, wherein the first forming element is surrounded by a movably arranged tubular punching knife, wherein a movement of the sheet is forced in two opposite directions with respect to the portions of the first forming element and the second forming element facing each other, between which the sheet is clamped, in order to put a first portion of the sheet to a condition in which it contacts the forming surface of the first forming element and thereby constitutes the tray, and to put a second portion of the sheet in a condition in which it contacts the forming surface of the second forming element and thereby constitutes the cover rim, and wherein the punching knife is moved in the direction of the sheet and is partially pressed in the sheet in order to realize the breaking portion between the tray and the cover rim.

5. The method according to claim 4, wherein weaker and less weak portions of the breaking portion are realized by applying a serrated punching knife.

6. The method according to claim 4, wherein openings are realized between the tray and the cover rim at defined places by applying the punching knife.

7. The method according to claim 4, wherein the package is detached from surrounding material of the sheet, and wherein the movement of the punching knife in the sheet is carried out simultaneously therewith.

8. The method according to claim 1, wherein the sheet is heated prior to forming the sheet.

9. The method according to claim 1, wherein a piece of cover foil is provided and is connected to the cover rim for sealing the tray.

10. The method according to claim 1, wherein the cover rim and the tray are detached from each other by forcing a limited mutual movement of the cover rim and the tray, wherein the breaking portion is broken, wherein a clamping connection is established between the cover rim and the tray, and wherein a piece of cover foil is provided and connected to at least the cover rim for sealing the tray.

11. The method according to claim 10, wherein the piece of cover foil is connected to at least the cover rim during the mutual movement of the cover rim and the tray.

12. The method according to claim 10, wherein the mutual movement of the cover rim and the tray is ended when a surface of the cover rim and a circumferential surface of the tray which is located at the open side of the tray are at a practically equal level.

13. The method according to claim 10, wherein the piece of cover foil is connected to both the tray and the cover rim.

14. A mold for application for the purpose of a method for manufacturing a package comprising an entirety of a tray having an open side and a ring-shaped cover rim which is located at the open side of the tray, at an outer circumferential rim of the tray, and which is connected to the tray through a relatively weak breaking portion, on the basis of a sheet which is placed in the mold, wherein the mold is adapted to allow for a forced movement of the sheet in two different directions, wherein the mold comprises means for clamping the sheet along a ring-shaped portion, and wherein the mold comprises means for applying gas pressure differences over the sheet in two different directions for moving different ring-shaped portions of the sheet in the two different directions.

15. The mold according to claim 14, adapted to form the cover rim with an inner ring and arranging an inward bulge therein, along at least a portion of the circumference thereof.

16. The mold according to claim 14 further comprising a number of separate elements, including a first forming element having a forming surface which is shaped according to an under surface of the tray, and a second forming element having a forming surface which is shaped according to an upper surface of the cover rim, each being destined for placement at another side of the sheet.

17. The mold according to claim 16 further comprising a movably arranged tubular punching knife for surrounding the first forming element.

18. The mold according to claim 17, wherein the punching knife is serrated.

* * * * *